(12) United States Patent
Farah

(10) Patent No.: US 10,625,712 B2
(45) Date of Patent: Apr. 21, 2020

(54) METHOD AND APPARATUS FOR SECURELY ACCESSING AN AUTOMOBILE IGNITION KEY

(71) Applicant: Naema S Farah, London (GB)

(72) Inventor: Naema S Farah, London (GB)

(73) Assignee: Naema S. Farah, Wembley, Middlesex ( * ) Notice: Subject to any disclaimer, the term of this patent is extended or adjusted under 35 U.S.C. 154(b) by 0 days.

(21) Appl. No.: 16/048,269

(22) Filed: Jul. 28, 2018

(65) Prior Publication Data

US 2020/0031311 A1    Jan. 30, 2020

(51) Int. Cl.
*B60R 25/04*  (2013.01)
*B60R 25/10*  (2013.01)
*B60R 25/23*  (2013.01)
*B60R 25/25*  (2013.01)

(52) U.S. Cl.
CPC .......... *B60R 25/04* (2013.01); *B60R 25/1003* (2013.01); *B60R 25/23* (2013.01); *B60R 25/252* (2013.01)

(58) Field of Classification Search
CPC .................. B60R 25/04; B60R 25/252; G07C 2009/00984; G07C 9/00952
USPC ......................................................... 340/5.5
See application file for complete search history.

(56) References Cited

U.S. PATENT DOCUMENTS

| | | | | |
|---|---|---|---|---|
| 2006/0253711 A1* | 11/2006 | Kallmann | ............ | B60K 28/063 713/186 |
| 2008/0250829 A1* | 10/2008 | Kamiki | ................ | B60K 28/063 70/344 |
| 2014/0344921 A1* | 11/2014 | Hamlin | .................... | G06F 21/32 726/19 |
| 2015/0081552 A1* | 3/2015 | Stewart | ............ | G06Q 20/40145 705/44 |

* cited by examiner

*Primary Examiner* — Vernal U Brown

(57) ABSTRACT

A method, apparatus and a computer-readable medium for securing an automobile ignition key, including scanning an authorized user's fingerprint, as well as inputting a security code chosen by the authorized user. Verifying users whether they are authorized to access the automobile ignition key, allowing a user when verified, and denying access when the verification steps fails.

20 Claims, 6 Drawing Sheets

METHOD AND APPARATUS FOR SECURELY ACCESSING AN AUTOMOBILE IGNITION KEY

FIELD OF THE INVENTION

The present invention generally provides a method and apparatus for accessing an automobile, and particularly a method and apparatus for securely accessing a key fob of an automobile in order to enter and operate the automobile.

BACKGROUND OF THE INVENTION

Key fobs are known in the art for remotely transmitting a radio frequency signals to an automobile. Such signals may instruct the vehicle to lock or unlock its doors, open a trunk compartment, sound the horn, or start the engine, for example.

Known key fobs include a button to be pushed for de-latching the ignition key. One major problem may be that anyone, including family members, such as one's teenage children, can pick up the key, access the automobile, and readily operate it.

One other potential problem with known key fobs is that non-family members, such as, co-workers, someone who may find one's lost key fob may easily find the automobile, and operate it without any hindrance.

There are a myriad of prior art patents and patent application publications in the key fob space. One such piece of prior art is U.S. Pat. No. 6,016,676 to McConnell, in which is disclosed a universal key fob that includes a housing to which is mountable one of a plurality of accessories. A key shank is mountable to the housing in order to provide a key head fob. Another piece of prior art is U.S. Patent Application publication 2006/0023442 to De Los Santos et al. in which a key fob for keyless entry into an automobile includes a substantially rigid housing having an outer surface with a ridge or a recess. Signal transmission circuitry is disposed within the housing and is operable to transmit a signal to the automobile. A flexible shell includes a cavity in which the housing is at least partially received, is disclosed What is lacking in the automobile key fob space and is needed in the art is a key fob that allows a secure way of accessing the ignition key, in order to protect against the use of the automobile by anyone not authorized to operate the automobile.

SUMMARY OF THE INVENTION

This present invention provides a mechanism for allowing an authorized user to access an ignition key of an automobile key fob.

According to one embodiment of the invention, an automobile key fob for keyless entry into an automobile includes a fingerprint scanner for scanning a fingerprint of an authorized user. And by having a specific fingerprint of an authorized user scanned, the method and apparatus of the present invention allows multiple authorized users to access the automobile ignition key.

According to another embodiment of the invention, the key fob for the keyless entry into an automobile includes a display for displaying the status of a scanned fingerprint, as being accepted or not accepted during initial registration of the user's scanned fingerprint. In addition, and during the process of accessing the automobile ignition key, the display also indicates whether the scanned fingerprint is an authorized one or not.

According to yet another embodiment of the invention, the key fob for the keyless entry into an automobile includes a latch for receiving an electrical signal for releasing the automobile ignition key once the scanned fingerprint is accepted.

According to another aspect of the current invention, there is provided a non-transitory computer readable medium, having stored there on a computer program having a plurality of code sections executable by a processor, for causing a automobile key fob to perform the operations of the method described above.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

DETAILED DESCRIPTION OF THE INVENTION

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

Figure 1:
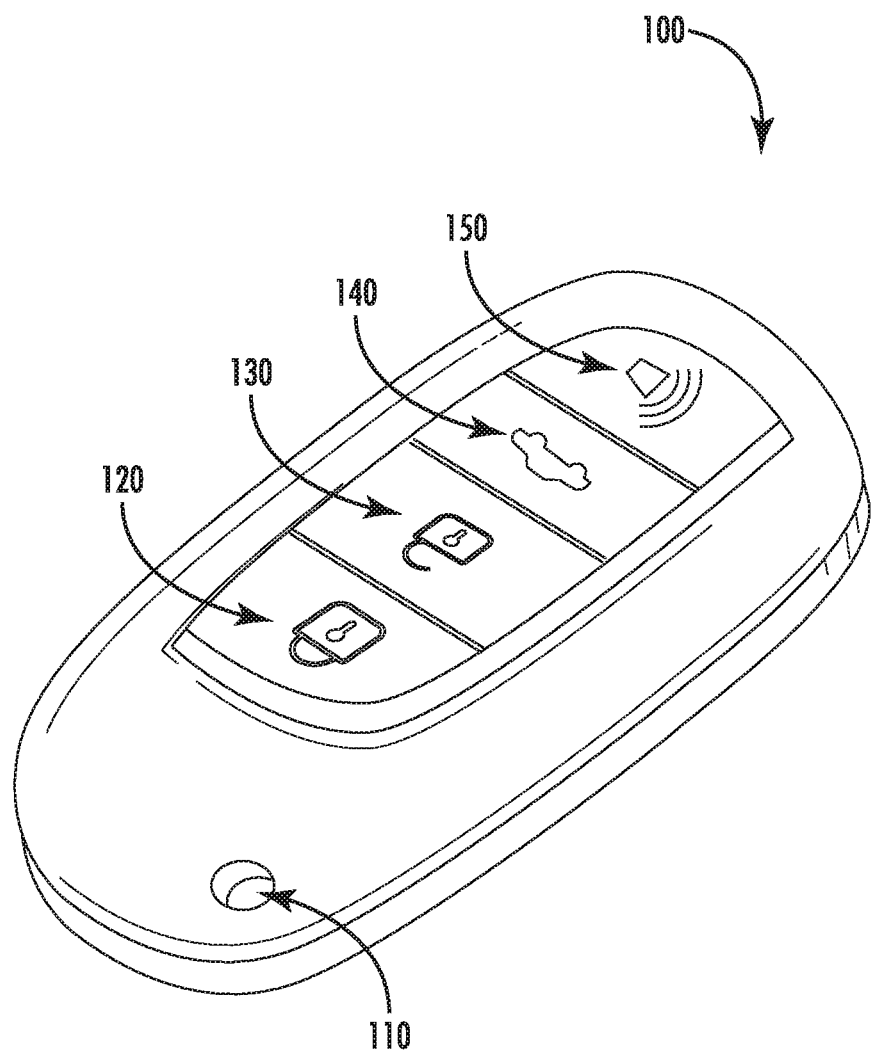
FIG. 1 provides a prior art automobile key fob in a closed position.
Figure 2:
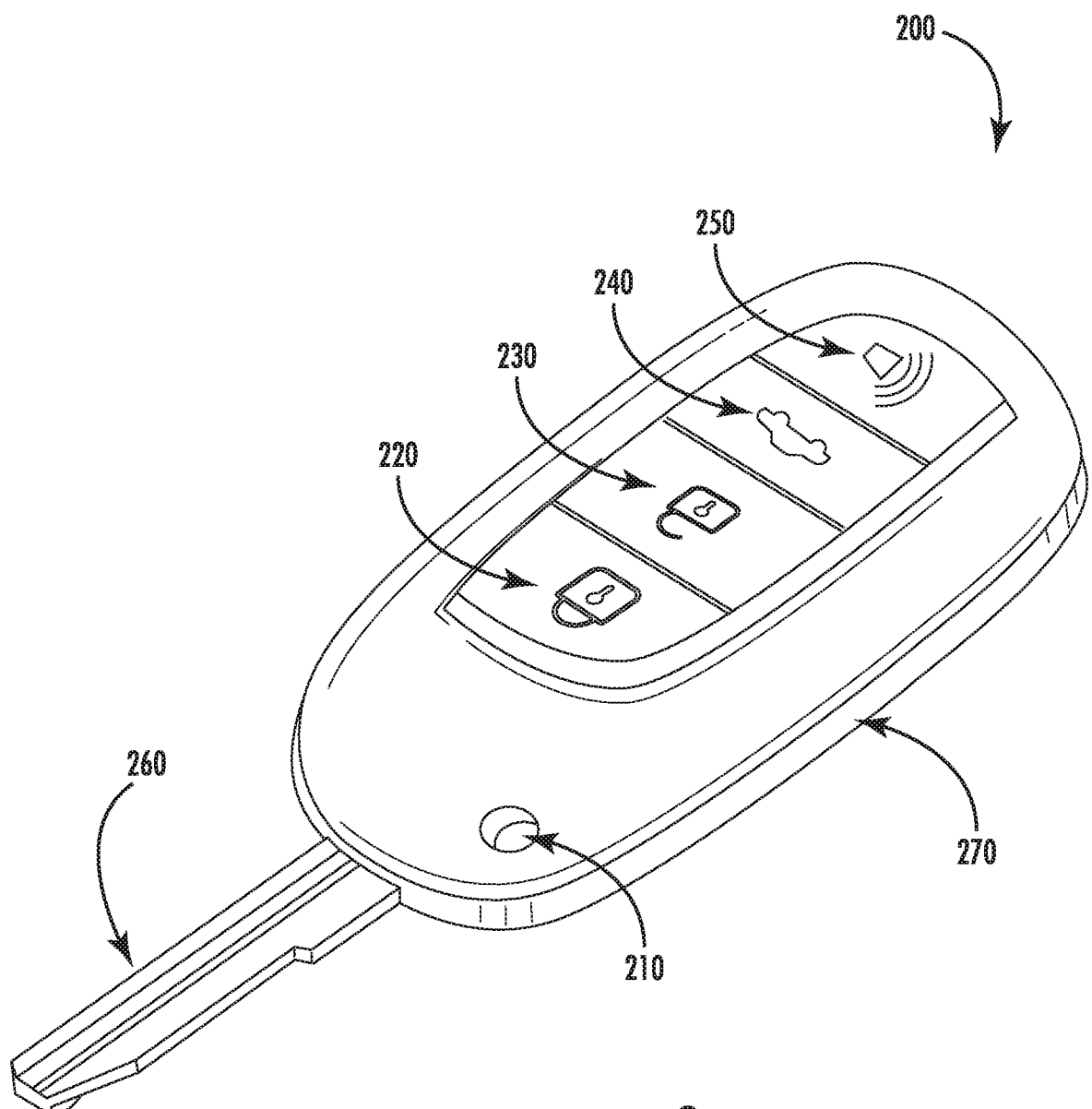
FIG. 2 provides a prior art automobile key fob in an open position, showing the ignition key.

Detailed reference will now be made to embodiments of the present invention, examples of which are illustrated in FIGS. 1 through 6, of which FIGS. 1 and 2 are prior art. FIG. 1 shows a typical key fob 100, in which the ignition key is in a closed position, that includes an ignition key ejection button 110, remote buttons, such as a lock button 120, an unlock button 130, a button for unlocking the trunk 140, and an alarm button 150. FIG. 2 is the same as FIG. 1, except the ignition key is in the open position, including an ignition key ejection button 210, remote buttons, such as a lock button 220, an unlock button 230, a button for unlocking the trunk 240, and an alarm button 250, and the storage of the ignition key 270, when it is not in use.

Figure 3A:
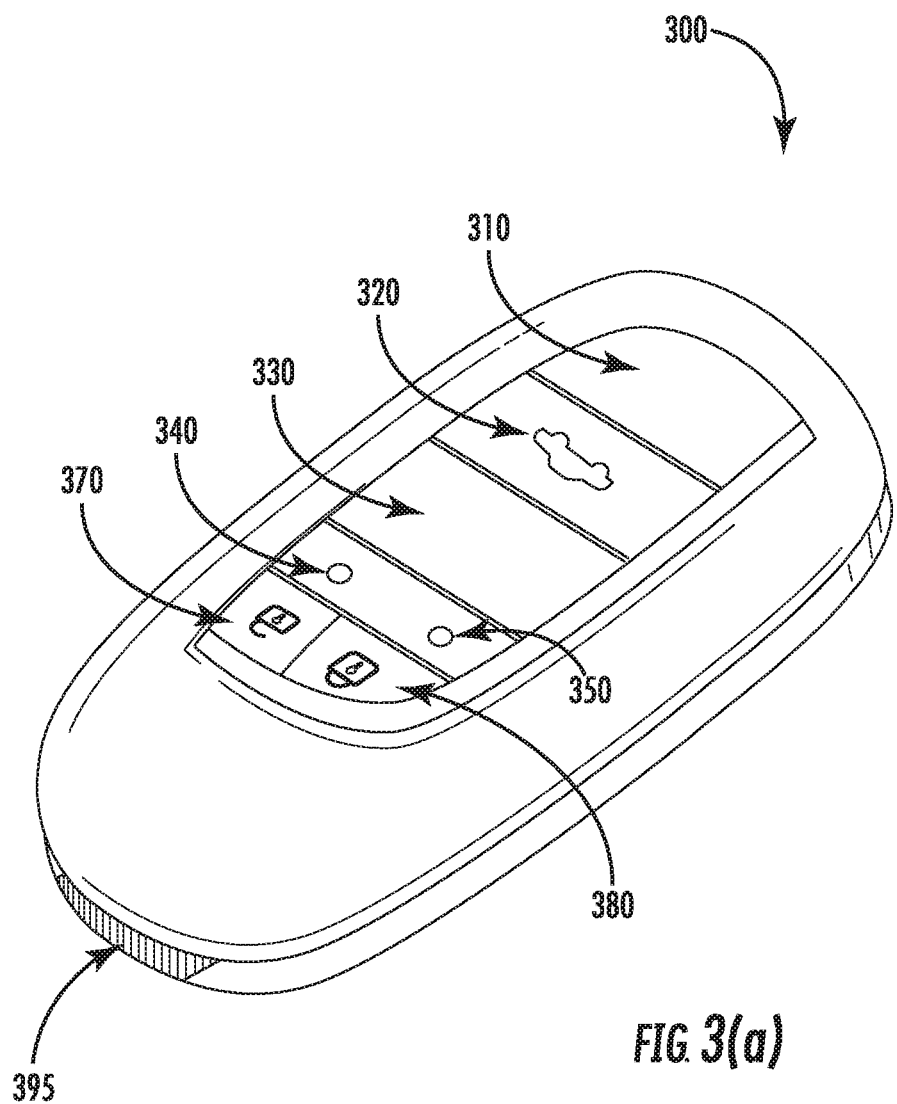
FIG. 3(a) provides an automobile key fob, including a fingerprint scanner, a display, and indicator lights in accordance with the first embodiment of the present invention.

In a first embodiment of the present invention and in reference to FIG. 3(a), where the key fob includes the customary buttons for lock 380, unlock 370 and trunk release 320. In addition, the key fob of the present invention includes a fingerprint scanner 310 for scanning an authorized user's fingerprint, a display 330 for displaying instructional information during registration of an authorized user, and for displaying verification information when accessing the key fob of the present invention. A couple of LED lights, one green 350 for indicating that the scanned fingerprint is a fingerprint belonging to an authorized user, and a red LED 340, for indicating that the scanned fingerprint belongs to an unknown and an un-authorized user.

Figure 3B:
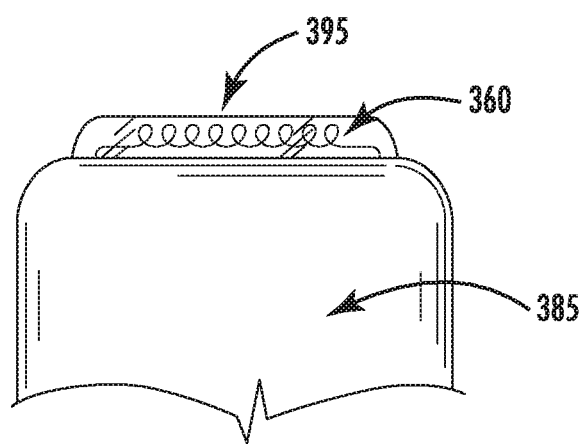
FIG. 3(b) provides a spring-loaded cover seen from the bottom of the key fob for closing the key compartment when the key is not in use, in accordance with another embodiment of the present invention.

In another embodiment of the present invention, and in reference to FIG. 3(b), there is shown from a bottom perspective of the key fob 385, a spring-loaded cover 395 for securely storing the ignition key (see FIG. 4, #410), when the user of the key fob decides to stow away the ignition key. Once the user decides to stow away the ignition key by pushing button 380, the spring-loaded cover 395 is pushed back in place by the spring 360 to cover the opening where the ignition comes out. Likewise, when the user pushes down on button 370, the verification process as discussed in the first embodiment above, and once the user is verified, the ignition key is released, pushing the spring-loaded cover 395 out. In a different variation of the present invention, the spring-loaded cover 395 is electrically connected to the solenoid (item 640) shown on FIG. 6 for electro-mechanically opening and closing the spring-loaded cover 395 during the ignition key activation and de-activation processes.

Figure 4:
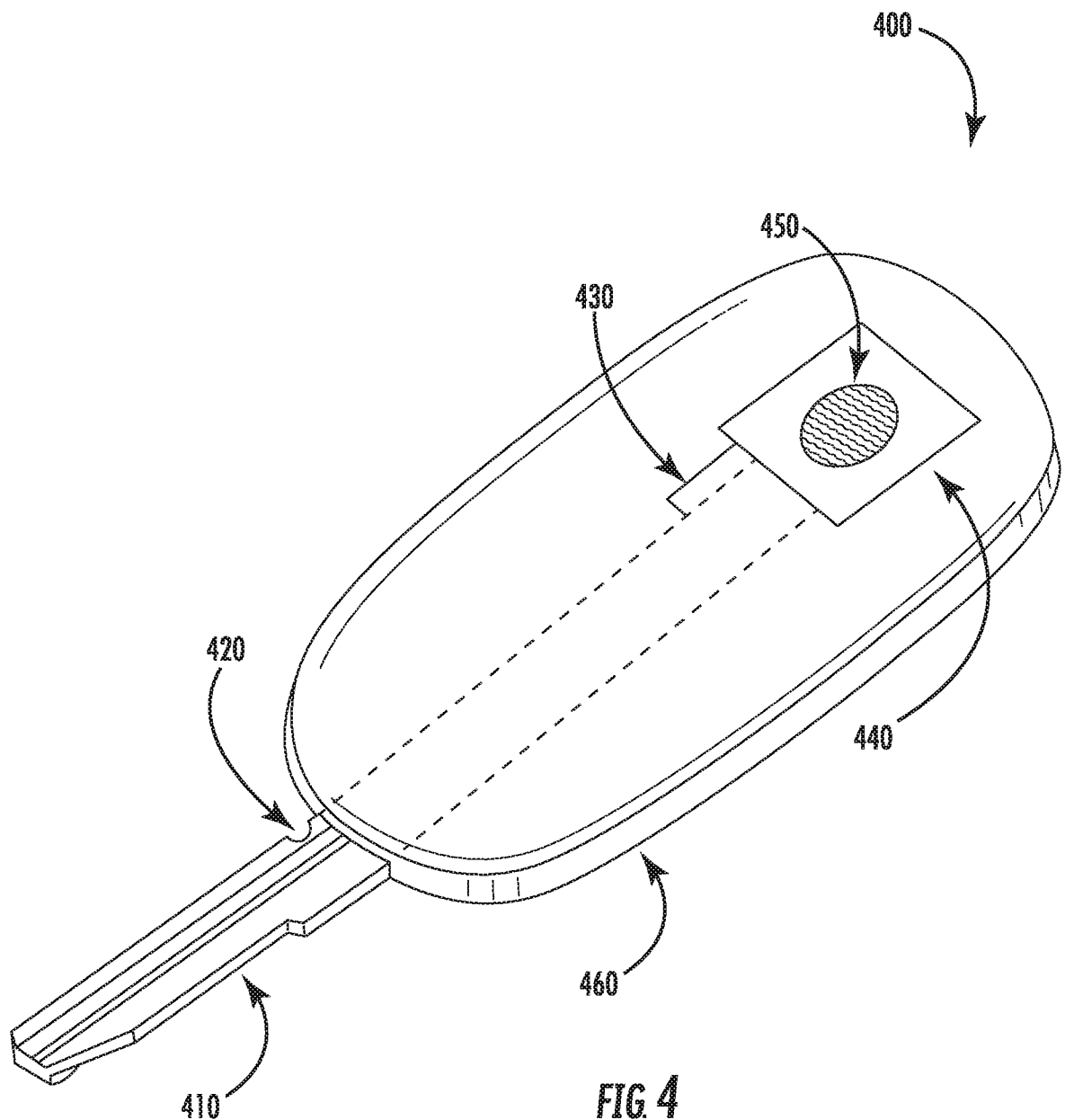
FIG. 4 provides an automobile key fob with a fingerprint scanner, and a latch for holding the key inside the housing in accordance with the first embodiment of the present invention.

In another embodiment and in reference to FIG. 4, the improved key fob 400, includes a block 440 containing a fingerprint scanner 450 for scanning fingerprint of a user to be authorized or a user who is already an authorized user; a notch 420 on the ignition key 410, that when the ignition key 400 is pushed back into the housing 460, the notch 420 is held by latch 430.

Figure 5:
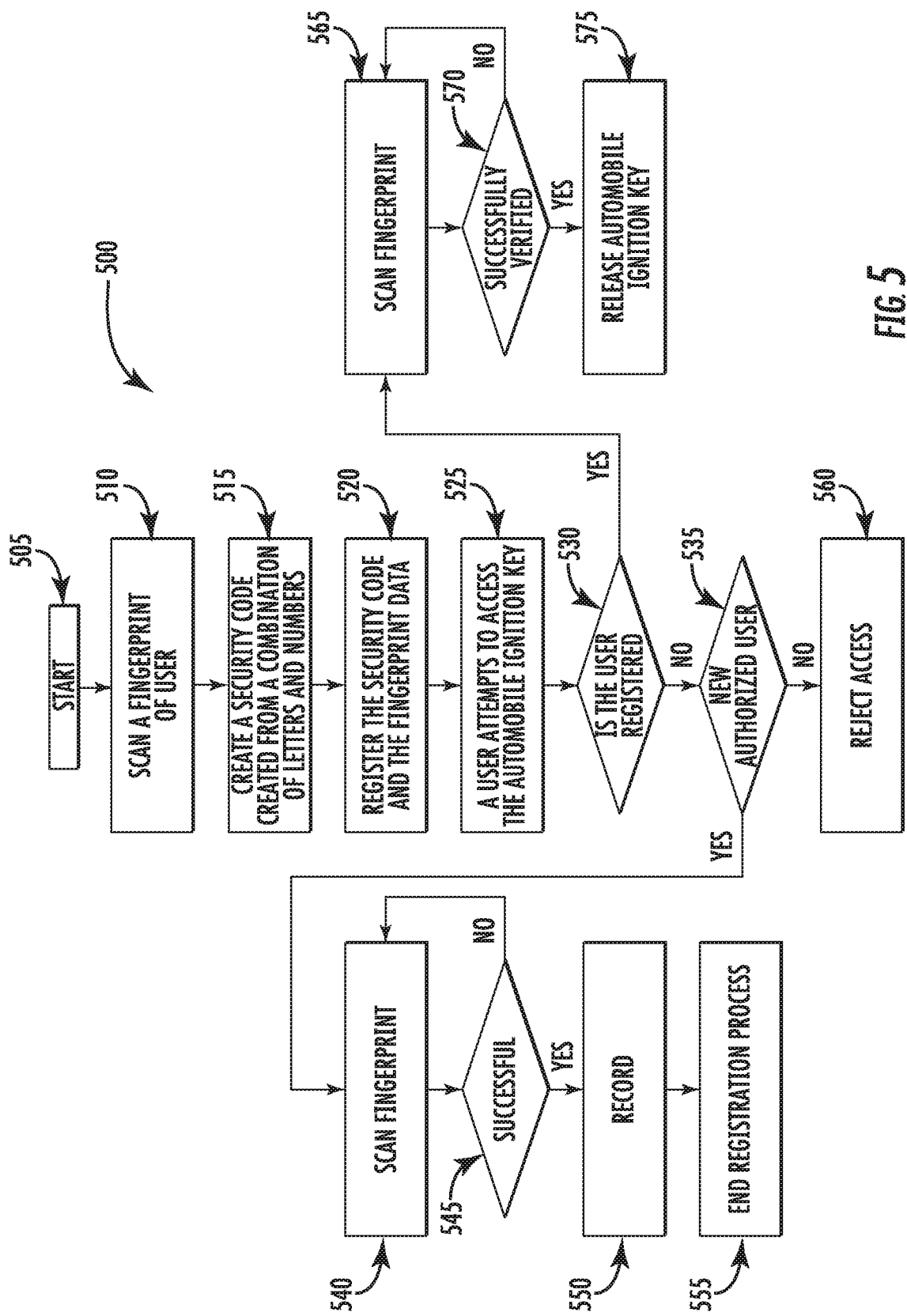
FIG. 5 provides a flow chart illustrating method steps for accessing an ignition key of an automobile key fob in accordance with the first embodiment of the present invention.
Figure 6:
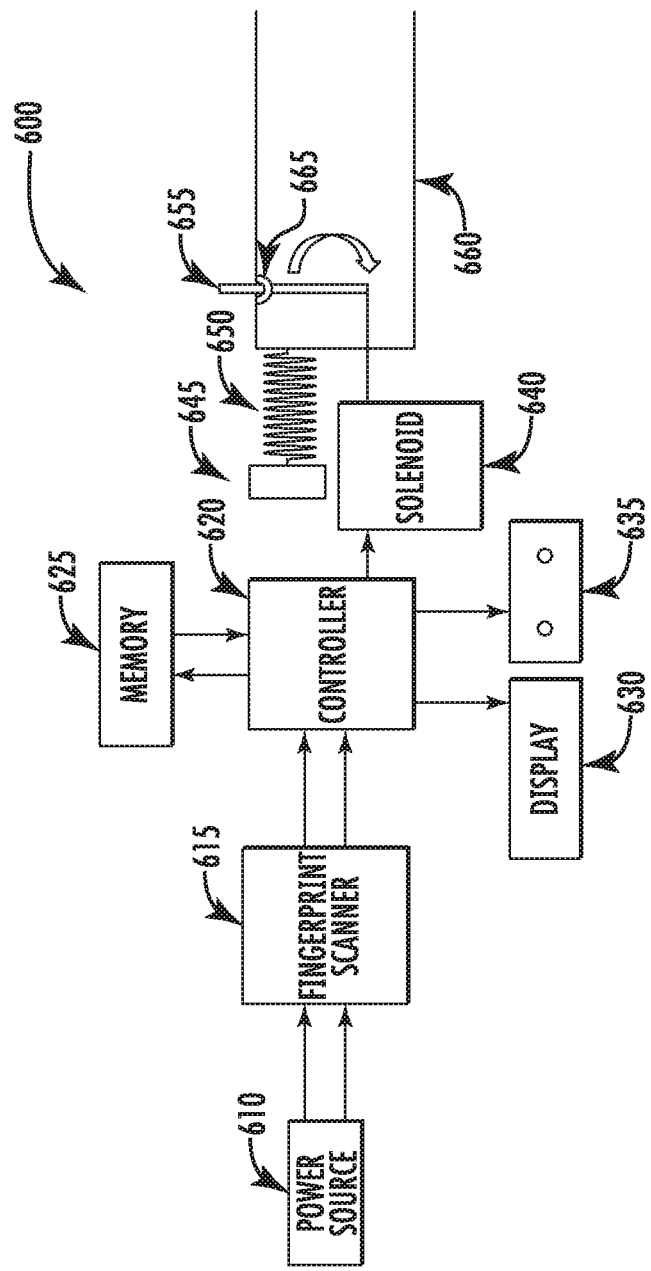
FIG. 6 provides a schematic diagram of an automobile key fob in accordance with the first embodiment of the present invention.

Referring now to FIG. 5, the user begins the process at step 505, moves on to step 510, by instructing the user to scan his or her own fingerprint by the on-board fingerprint scanner (see FIG. 4, #450) to create a profile of the user, then the process moves on to step 515 to create a security code created from a combination of letters and numbers, then in step 520 to register the user's scanned fingerprint data along with created security data, and saving it in the memory 625 of FIG. 6. Once the fingerprint scan and the security data is created for the authorized user, and he or she subsequently intends to access the automobile ignition key in order to operate the automobile associated with the automobile ignition key in step 525. The system then moves onto step 530, to check whether the user attempting to access the automobile ignition key is registered and is an authorized user, the method moves onto step 565, where the authorized user is requested to scan his or her fingerprint. The scanned fingerprint is analyzed and verified in step 570; if the verification fails, the scanned fingerprint is re-verified, if a secondary verification is required, the user is required to input his or her security code via the display. When the controller of FIG. 6 determines that the user is an authorized user the inputted code is the correct code in step 505, the user is allowed access to the key fob in step 506 and may open the key fob in step 507. When the controller of FIG. 6 ascertains that the scanned fingerprint is verified, the automobile ignition key is released for potential use by the user. in step 570.

Furthermore, and going back to step 530, where the system checks whether the user is a registered user, if the answer is "No", the step of checking whether the unregistered new user is someone the owner of the automobile key fob is allowing to be authorized to be registered in step 535. The system then moves onto step 540 where the new authorized user's fingerprint is scanned, if the scan is successful in step 545, the data associated with the scanned fingerprint is recorded in step 550, and the registration process for the new authorized user ends in step 555. If the scan is unsuccessful, the fingerprint scanning is repeated until it is successful. If the user is not a newly authorized user, the accessing process is rejected in step 560.

Referring now to FIG. 6, there is shown a block diagram of new and improved automobile key fob of the present invention. It includes a power source 610, typically are small dry-cell batteries, sealed, non-rechargeable AA, 9-volt. A fingerprint scanner 615 for scanning the fingerprint of a user, which is recorded and saved in an on-board memory unit 625. A controller 620, for analyzing and verifying any scanned fingerprint is also included. Furthermore, the controller 620 transmits instructions to be displayed by a display 630 that is configured to display instructions for initially registering a new user. In addition, included are two LEDs 635, one red for indicating an error, any inputted data, be it a registration code or a scanned fingerprint. And a green LED for indicating the inputted data that it is accepted by the system. The improved automobile key fob of the present invention includes a solenoid 640, that receives a control signal from controller 620, and sequentially moves a latch 655 away from a notch 665 in the direction of the arrow. The ignition key 660 is pushed in to the housing. Once pushed in, spring 650 compresses, thereby allowing the notch 665 of the ignition key 660 to be held by the latch 655. When an authorized user's fingerprint is scanned and verified, the controller 620 transmits a signal to the solenoid 640, which successively releases the ignition key 660 in order for it to be used for any purpose deemed useful, such as, unlocking the automobile, starting the engine, etc.

In accordance with another embodiment of the present disclosure, an automobile key fob device comprises a non-transitory memory storage containing instructions and one or more processors in communication with the memory storage. The one or more processors execute the instructions to scanning a fingerprint of a user by a fingerprint scanner on the automobile key fob to acquire fingerprint data of the user; allowing the user to initially input a security code via a display for registering access; analyzing and verifying the scanned fingerprint by a controller; registering and storing the fingerprint data of the user, as well as the security code in a memory module connected to the controller; indicating that when the correct security code is inputted, and that when the correct fingerprint is scanned a green LED is turned on, and for indicating that an incorrect security code is inputted and that an incorrect fingerprint is scanned a red LED is turned on; receiving a signal from the controller that the security code and the scanned fingerprint is for an authorized user; energizing a solenoid inside the automobile key fob for releasing the automobile ignition key by moving a latch holding the automobile ignition key at a notch; and securing the automobile ignition key when the automobile ignition key is pushed in by the user, by hooking the automobile ignition key to the latch, and snapping back the spring-loaded cover to further secure the automobile ignition key.

While the invention has been described by reference to certain preferred embodiments, it should be understood that numerous changes could be made within the spirit and scope of the inventive concept described. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. An automobile fob comprising:
an automobile ignition key;
a fingerprint scanner for scanning a fingerprint of a user;
a display for allowing the user to initially input a security code for registering access;
a memory module for storing fingerprint data of the user, as well as the security code;
a controller for analyzing and verifying the scanned fingerprint;
a green LED for indicating that the correct security code is inputted, and that the correct fingerprint is scanned, and a red LED for indicating that an incorrect security code is inputted and that an incorrect fingerprint is scanned;
a solenoid for receiving an energizing signal from the controller;
a spring loaded cover for securing the automobile ignition key when the automobile ignition key is secured inside the fob; and
a latch that moves from a notch on the automobile ignition key, when activated by said solenoid, to release the automobile ignition key.

2. The automobile key fob of claim 1, wherein the security code comprises a combination of letters and numbers.

3. The automobile key fob of claim 1, wherein the display is configured to allow the user to input the initially inputted security code.

4. The automobile key fob of claim 1, wherein the fingerprint scanner scans the user's fingerprint data, to be registered and then compares the scanned fingerprint data to the registered fingerprint data, during verification.

5. The automobile key fob of claim 1, wherein the electronic unit is further configured to accept more than one security code, and more than one fingerprint.

6. The automobile key fob of claim 1, further including a memory module for saving the inputted security codes, and fingerprint data of the user.

7. The automobile key fob of claim 1, further including a spring that compresses when the automobile ignition key is pushed into the housing, and the spring loaded cover snaps back to further secure the automobile ignition key.

8. A method for accessing an automobile ignition key of an automobile key fob, comprising:
scanning a fingerprint of a user by a fingerprint scanner on the automobile key fob to acquire fingerprint data of the user;
allowing the user to initially input a security code via display for registering access;
registering the user's fingerprint data and the inputted security code;
storing the fingerprint data of the user, as well as the security code in a memory module;
analyzing and verifying the scanned fingerprint data of the user by a controller during subsequent attempt to access the automobile ignition key;
indicating that the correct security code is inputted, and that the correct fingerprint is scanned a green LED is turned on, and for indicating that the incorrect security code is inputted, and that the incorrect fingerprint is scanned a red LED is turned on;
receiving a signal from the controller that the security code and the scanned fingerprint is for an authorized user, energizing a solenoid inside the automobile key fob for releasing the automobile ignition by moving a latch holding the automobile ignition at a notch; and
securing the automobile ignition key when the automobile ignition key is pushed in by the user, by hooking the automobile ignition key to the latch, and snapping back a spring-loaded cover to further secure the automobile ignition key.

9. The automobile key fob of claim 8, wherein the security code comprises a combination of letters and numbers.

10. The automobile key fob of claim 8, wherein the display is configured to allow the user to input the initially inputted security code.

11. The automobile key fob of claim 8, wherein the fingerprint scanner scans the user's fingerprint data, to be registered and then compares the scanned fingerprint data to the registered fingerprint data, during verification.

12. The automobile key fob of claim 8, wherein the electronic unit is further configured to accept more than one security code, and more than one fingerprint data.

13. The automobile key fob of claim 8, further including a memory module for saving inputted security codes, and fingerprint data of the user.

14. The automobile key fob of claim 8, further including a spring that compresses when the automobile ignition key is pushed into the housing, and the spring-loaded cover snaps back to further secure the automobile ignition key.

15. An automobile key fob device, comprising: non-transitory memory storage containing instructions; and one ore more processors in communication with a more storage, wherein the one or more processors execute the instructions to perform a method comprising:
scanning a fingerprint of a user by a fingerprint scanner on the automobile key fob to acquire fingerprint data of the user;
allowing the user to initially input a security code via display for registering access;
registering the user's fingerprint data and the inputted security code;
storing the fingerprint data of the user, as well as the security code in a memory module;
analyzing and verifying the scanned fingerprint data of the user by a controller during subsequent attempt to access the automobile ignition key;
indicating that the correct security code is inputted, and that the correct fingerprint is scanned a green LED is turned on, and for indicating that the incorrect security code is inputted, and that the incorrect fingerprint is scanned a red LED is turned on;

receiving a signal from the controller that the security code and the scanned fingerprint is for an authorized user, energizing a solenoid inside the automobile key fob for releasing the automobile ignition by moving a latch holding the automobile ignition at a notch; and securing the automobile ignition key when the automobile ignition key is pushed in by the user, by hooking the automobile ignition key to the latch, and snapping back a spring-loaded cover to further secure the automobile ignition key.

16. The automobile key fob of claim 15, wherein the security code comprises a combination of letters and numbers.

17. The automobile key fob of claim 15, wherein the display is configured to allow the user to input the initially inputted security code.

18. The automobile key fob of claim 15, wherein the fingerprint scanner scans the user's fingerprint data, to be compared to the earlier recorded data.

19. The automobile key fob of claim 15, wherein the electronic unit is further configured to accept more than one security code, and more than one fingerprint data.

20. The automobile key fob of claim 15, further including a memory module for saving inputted security codes, and fingerprint data of the user.

\* \* \* \* \*